US012725085B2

(12) United States Patent
Zhang et al.

(10) Patent No.: US 12,725,085 B2
(45) Date of Patent: Sep. 1, 2026

(54) TERAHERTZ SPECTROSCOPY SYSTEM WITH SPECIALIZED MEASUREMENT UNIT FOR NON-DESTRUCTIVE SAMPLE DETECTION

(71) Applicant: ANOR TECHNOLOGIES PTE. LTD., Singapore (SG)

(72) Inventors: Nan Zhang, Singapore (SG); Haiwen Gu, Singapore (SG)

(73) Assignee: ANOR TECHNOLOGIES PTE. LTD., Singapore (SG)

(*) Notice: Subject to any disclaimer, the term of this patent is extended or adjusted under 35 U.S.C. 154(b) by 286 days.

(21) Appl. No.: 18/697,737

(22) PCT Filed: Jun. 21, 2021

(86) PCT No.: PCT/SG2021/050359
§ 371 (c)(1),
(2) Date: Apr. 2, 2024

(87) PCT Pub. No.: WO2022/271079
PCT Pub. Date: Dec. 29, 2022

(65) Prior Publication Data

US 2025/0076192 A1 Mar. 6, 2025

(51) Int. Cl.
*G06N 20/00* (2019.01)
*G01N 1/30* (2006.01)
(Continued)

(52) U.S. Cl.
CPC ............... *G06N 20/00* (2019.01); *G01N 1/30* (2013.01); *G01N 21/3586* (2013.01); *G06N 7/01* (2023.01)

(58) Field of Classification Search
CPC ............ G06N 20/00; G06N 7/01; G06N 3/08; G06N 20/10; G01N 1/30; G01N 21/3586;
(Continued)

(56) References Cited

U.S. PATENT DOCUMENTS

2012/0273681 A1* 11/2012 Schulkin ............ G01N 21/3586 250/339.06
2016/0116402 A1 4/2016 Chen et al.
2019/0204215 A1 7/2019 Seo et al.

FOREIGN PATENT DOCUMENTS

CN 107192689 A * 9/2017 ......... G01N 21/3586
CN 105445219 B * 12/2017 ......... G01N 21/3581
(Continued)

OTHER PUBLICATIONS

Yichao Li et al., "Terahertz Spectroscopic Material Identification Using Approximate Entropy and Deep Neural Network", 2017 IEEE National Aerospace and Electronics Conference (NAECON), IEEE, Jun. 2017, pp. 52-56.
(Continued)

*Primary Examiner* — David J Makiya
*Assistant Examiner* — William Laurence Taylor
(74) *Attorney, Agent, or Firm* — IDEA Intellectual Limited; Sam T. Yip

(57) ABSTRACT

The present application discloses a measurement unit for holding a sample (including a powder sample in small quantity, a scattered powder sample or an aqueous solution sample) for a terahertz beam irradiation; and a terahertz spectroscopy system with the measurement unit for measuring an absorption signal from the sample. In particular, the terahertz beam can be reflected for multiple times through the sample in the measurement unit for enhancing the absorption signal. The present application discloses three non-destructive methods of measuring the absorption signal of the sample using the terahertz spectroscopy system.

14 Claims, 12 Drawing Sheets

(51) Int. Cl.
*G01N 21/3586* (2014.01)
*G06N 7/01* (2023.01)

(58) Field of Classification Search
CPC .......... G01N 2021/0339; G01N 21/03; G01N 33/0091; G01R 33/00; G06F 18/2135; G06F 18/2411; G06F 2218/04; G06F 2218/12
See application file for complete search history.

(56) References Cited

FOREIGN PATENT DOCUMENTS

| | | | | | |
|---|---|---|---|---|---|
| CN | 110751230 | A | | 2/2020 | |
| CN | 111855607 | A | * | 10/2020 | ......... G01N 21/3563 |
| EP | 3037805 | A1 | | 6/2016 | |
| WO | WO-9300580 | A1 | * | 1/1993 | ............. G01N 21/35 |
| WO | 2002077607 | A2 | | 10/2002 | |
| WO | 2004106905 | A1 | | 12/2004 | |
| WO | WO-2008026523 | A1 | * | 3/2008 | ......... G01N 21/3581 |
| WO | WO-2017048871 | A1 | * | 3/2017 | ........... G01N 1/2813 |

OTHER PUBLICATIONS

E. García-García et al., "Terahertz Time Domain Spectroscopy for Chemical Identification", 2013 Spanish Conference on Electron Devices, IEEE, Feb. 2013, pp. 199-202.

N. Laman et al., "High-Resolution Waveguide THz Spectroscopy of Biological Molecules", Biophysical Journal, Biophysical Society, Feb. 2008, vol. 94, Iss. 3, pp. 1010-1020.

Michael G. Madden et al., "A Machine Learning Application for Classification of Chemical Spectra", Applications and Innovations in Intelligent Systems XVI, Proceedings of AI—2008, The Twenty-eighth SGAI International Conference on Innovative Techniques and Applications of Artificial Intelligence, Springer, 2009, pp. 77-90.

Michael G. Madden et al., "Machine Learning Methods for Quantitative Analysis of Raman Spectroscopy Data", Opto—Ireland 2002: Optics and Photonics Technologies and Applications, SPIE, Aug. 2003, vol. 4876, pp. 1130-1139.

* cited by examiner

700

800

TERAHERTZ SPECTROSCOPY SYSTEM WITH SPECIALIZED MEASUREMENT UNIT FOR NON-DESTRUCTIVE SAMPLE DETECTION

The present application generally relates to a terahertz spectroscopy system; and more particularly relates to a measurement unit of the terahertz spectroscopy system for measuring powder samples in small quantity enclosed in a package or for directly measuring liquid samples. The present application also relates to a non destructive method of detecting the powder samples or the liquid samples using the terahertz spectroscopy system. The present application further relates to a terahertz spectroscopy testing device having the terahertz spectroscopy system.

Terahertz spectroscopy has been used as a non-contact, non-destructive, and label-free sensing tool suitable for examination of biological and chemical substances, due to its rich fingerprint information, good penetration capability, label-free quantitative counting and avoiding complexity from fluorescence tagging. However, it is still very difficult to measure terahertz signals from highly scattered samples, e.g. powder samples, especially if the powder samples are in small quantity or scattered in low concentration. In addition, it is also challenging to detect aqueous solutions since water has strong absorption to the terahertz signals.

Therefore, the present application aims to enhance sensitivity of the terahertz signals for effectively detecting the powder samples and the aqueous solutions using a terahertz spectroscopy. As a first aspect, the present application discloses a measurement unit for holding a sample (including a powder sample in small quantity, a scattered powder sample or an aqueous solution sample) in a terahertz spectroscopy. The small quantity can be less than 5 milligram (mg). The measurement unit comprises a cover plate for focusing a terahertz beam; and a bottom plate for enhancing an absorption signal of the sample to the terahertz beam. In particular, the sample is configured to be sandwiched between the cover plate and the bottom plate for absorbing the terahertz beam. When the terahertz beam passes through the sample in the measurement unit, terahertz electromagnetic waves in a certain range of frequencies of the terahertz beam is absorbed by the sample; and subsequently chemical properties and an amount of the sample are determined from the certain range of frequencies and strength of the absorption of the terahertz beam. The measurement unit has a compact profile with an outer dimension of 30 mm by 30 mm, in contrast to large profiles of most current sample holders for the existing terahertz spectroscopy system.

The measurement unit is suitable for various pulses and a continuous-wave terahertz range to the sample with the terahertz spectroscopy. In electromagnetic spectrum, the terahertz beam typically lies between microwave and infrared frequencies. In some implementations, the terahertz beam is configured in a range of 100 Gigahertz (GHz) to 10 Terahertz (THz). Accordingly, the terahertz beam has a wavelength ranging from 3 millimeters (mm) to 3.3 micrometers (pm). Particularly, the terahertz beam is configured in a range of 100 Gigahertz (GHz) to 3.5 Terahertz (THz). The electromagnetic wave in the terahertz range is also known as terahertz (THz) light, terahertz (THz) radiation, or terahertz (THz) waveforms.

The terahertz beam preferably transmits through the cover plate without loss for reducing scattering effects to the terahertz beam. In other words, the cover plate preferably has minimum reflection to the terahertz beam. As a result, the cover plate optionally comprises a non-polar polymeric material of low refractive index to the terahertz beam, such as high-density polyethylene (HDPE), low-density polyethylene (LDPE), polytetrafluoroethylene (Teflon), poly-4-methylpentene-1 (TPX), polypropylene and the alike.

The cover plate bas a first flat surface towards the terahertz beam and a first serrated surface opposed to the first flat surface for enhancing reflection of the terahertz beam. The cover plate enhances localized electromagnetic field at the first serrated surface and thus the terahertz beam would be reflected back when reaching the first serrated surface.

The first serrated surface may be fabricated various technologies, such as mechanical etching and template mold. For an example, the first serrated surface is fabricated by an imprinted mould by imprinting technology since the non-polar polymeric material has a softer nature than the imprinted mould.

The bottom plate optionally comprises a multilayer structure for cooperating with the cover layer. The multilayer structure would direct the terahertz beam for multiple reflections in order to interact with the sample repetitively for collecting the absorption signal from the sample which is strong enough for obtaining information of the sample, at the end the terahertz beam transmits through the sample and the bottom plate.

In some implementations, the multilayer structure comprises a substrate layer having a second serrated surface to the terahertz beam and a second flat surface opposed to second serrated surface; an intermediate layer formed on the second serrated surface of the substrate layer for reflecting the terahertz beam; and a top layer formed on the intermediate layer for enhancing reflection of the terahertz beam. Therefore, the first serrated surface of the cover plate and the second serrated surface of the bottom layer face to each other in the measurement unit with the sample sandwiched there between; while the first flat surface of the cover plate and the second flat surface of the bottom layer face away from each other for the terahertz beam to transmit into and out of the measurement unit, respectively.

Similarly, the second serrated surface of the substrate layer is fabricated by mechanical etching, template mold or the alike to the soft substrate layer. As a result, the terahertz beam would be reflected between the cover plate and the bottom plate through the sample for multiple times; and a distance over which the terahertz beam interacts with the sample is increased. Therefore, the absorption signal and accompanying information from the sample would be accumulated and enhanced during the multiple reflections for enhancing sensitivity of detecting the sample by the terahertz beam.

The second serrated surface has a dimension less than several millimeter (mm) compared to wavelength of terahertz waves of the terahertz beam for creating an electric field enhancement effect to the terahertz beam. In some implementations, the second serrated surface has a plurality of repetitive features in a pyramid configuration. The pyramid configuration may have a side length of around 1 millimeter (mm), and a depth of around 0.5 millimeter (mm).

The terahertz beam preferably transmits finally through the substrate layer from the second flat surface without loss. As a result, the substrate layer optionally comprises a non-polar polymeric material which has high transmission to the terahertz beam, such as high-density polyethylene (HDPE), low-density polyethylene (LDPE), polytetrafluoroethylene (Teflon), poly-4-methylpentene-1 (TPX), polypropylene and the alike.

The intermediate layer optionally partially covers the serrated surface of the substrate layer; and thus the terahertz beam is reflected back and transmit trough at covered portion and uncovered portion of the substrate layer, respectively. The terahertz beam finally transmits out of the measurement unit from the uncover portion of the serrates surface of the bottom plate.

The intermediate layer optionally has a high reflection index to the terahertz beam for reflecting the terahertz beam as much as possible. In some implementations, the intermediate layer comprises a continuous metal film. In particular, the continuous metal film has a smooth surface in order not to form any metamaterial or nanostructure which would be resonant with and thus absorb the terahertz waves of the terahertz beam. In particular, the continuous metal film has a smooth surface for avoiding forming any metamaterial structure or nanostructure which would be resonant with and thus strongly absorb the terahertz beam.

In particular, the continuous metal film comprises a thickness larger than skin depth of terahertz waves of the terahertz beam. The skin depth refers to a distance an electromagnetic wave must travel before its amplitude has decayed by a factor of 1/e; and thus the skin depth is defined as a reciprocal of the decay constant b. The thickness of the continuous meal film is optionally larger than 200 nanometers (nm) for achieving total reflection of the terahertz beam back to the sample.

The continuous metal film optionally comprises some common metal coatings, such as a gold coating, a silver coating, an aluminum coating or any combination of the foregoing coatings for reflecting the terahertz beam.

The top layer optionally comprises an organic film for further enhancing reflection of the terahertz beam. The organic film optionally has low absorption loss to the terahertz beam, such as high density polyethylene (HDPE), low density polyethylene (LDPE), polytetrafluoroethylene (Teflon), poly-4-methylpentene-1 (TPX), polypropylene and other non-polar polymers. Therefore, the combination of the continuous metal film and the organic film can achieve total reflection to the terahertz beam. Similar to the continuous metal film, the organic film also has a smooth surface for avoiding formation of any confined structure (such as metamaterials, nano antenna structures) which would be resonant with and thus strongly absorb the terahertz beam.

The organic film comprises photonic structure (also known as photonic crystal) for preventing propagation of the terahertz beam and thus preferably for achieving total reflections to the terahertz beam. The photonic structure may be fabricated for one-dimension (1 D), two-dimension (2D), or three-dimension (3D). The one dimensional photonic structure is optionally made of layers deposited or stuck together. The two-dimensional photonic structure is optionally made by photolithography, or by drilling holes in a suitable base. The three-dimensional photonic structure is optionally made by drilling under different angles, stacking multiple 2-D layers on top of each other, direct laser writing, or, for example, instigating self-assembly of spheres in a matrix and dissolving the spheres.

The measurement unit may further comprise a waveguide as a confinement box for directing the terahertz beam from an emitter to a near-field of the measurement unit and the absorption signal to a detector. The waveguide is made of metallic materials (such as stainless steel) which would completely reflect the terahertz beam. In other words, the waveguide would not disrupt absorption of the terahertz beam by the sample. In addition, the measurement unit is preferably located at a focus point of the waveguide for focusing the terahertz beam to the sample. The focus point is determined by frequency of the terahertz beam and needs to be adjusted if the terahertz beam is replaced with a different frequency. Furthermore, the waveguide is detachable from the measurement unit for easy operation and maintenance. In some implementations, the waveguide is detachably clamped to the measurement unit; while in other implementations, the waveguide is detachably slotted into and out of the measurement unit.

The sample optionally comprises a powder sample in a small quantity, such as less than 5 milligram (mg). It is currently well acknowledged difficult to measure the absorption signal of the powder sample which tends to be scattered, especially in a small quantity or low concentration scattered in a matrix. Due to the multiple reflections of the terahertz beam between the cover plate and the bottom plate, the absorption signal of the terahertz beam through the sample is accumulated in the measurement unit; and thus sensitivity of the measurement unit is enhanced sufficiently to measure the scattered powder sample in small quantity.

The powder sample is configured to be enclosed into a plastic package which has a high transmission to the terahertz beam, such as high-density polyethylene (HDPE), low-density polyethylene (LDPE), polytetrafluoroethylene (teflon), poly-4-methylpentene-1 (TPX), polypropylene and the alike. Since the plastic package does not interfere with the absorption signal, it becomes more convenient to measure the powder sample in the measurement unit.

The sample optionally comprises an aqueous solution sample, such as a water solution sample. It is also currently well acknowledged difficult to measure the absorption signal of the aqueous solution sample since water has strong absorption to the terahertz beam. In some implementations, the aqueous solution sample may be dropped onto the bottom plate and dried to remove water before the terahertz beam is applied to the measurement unit.

As a second aspect, the present application discloses a terahertz spectroscopy system for detecting a sample, such as a powder sample in small quantity or an aqueous solution sample. The terahertz spectroscopy system comprises a terahertz radiation source for transmitting a terahertz beam; one or more measurement units described in the first aspect; and a terahertz radiation receiver for receiving the terahertz beam after passing through the measurement unit. The small, compact and high sensitivity enhanced measurement unit could easily fit into the terahertz portable spectroscopy system. The radiation source preferably has a wide bandwidth of the terahertz beam.

The terahertz radiation source may have various designs, such as synchrotrons, Free Electron Lasers (FELs), Backward Wave Oscillators (BWO tubes), Smith-Purcell emitters, IMPact Ionization Avalanche Transit-Time (IMPATT) diodes, Gunn diodes and terahertz lasers. In some implementations, the terahertz radiation source comprises a photonic radiation source, including terahertz antenna, non-linear crystal and photomixer. The terahertz antenna has advantages of small size, wide frequency bandwidth and high data rate. The non-linear crystal is a periodic structures whose optical response depends on the intensity of the optical field that propagates into the crystal. The photomixer has two independent tunable laser sources yielding different frequencies in a desired terahertz region by heterodyning; and then two laser beams with the different frequencies light a photoconductive antenna (PA), where running fringes with the terahertz different frequencies excite carries in the semiconductor material. In some implementations, the terahertz radiation source comprises an electronic radiation source, such as a complementary metal-oxide-semiconductor (CMOS) chip. In particular, the CMOS chip may be programmable for automatically controlling the terahertz beam. In some implementations, the terahertz radiation source comprises a plasma radiation source, such as femtosecond laser-based plasma radiation source in which high incident laser intensity is put into plasma formation and air and noble gases (such as Flelium (Fie), Neon (Ne), Argon (Ar), Krypton (Kr) and Xenon (Xe)) are used as targets for plasma-based terahertz emission.

The terahertz radiation source may have various designs. In some implementations, the terahertz radiation receiver comprises an antenna receiver, such as a plasmonic photo-mixing antenna having high-performance to receive the terahertz beam. In some implementations, the terahertz radiation receiver comprises a non-linear crystal receiver. Similar to the terahertz radiation source, the non-linear crystal of the terahertz receiver is also a periodic structures whose optical response depends on the intensity of the optical field that propagates into the crystal. In some implementations, the terahertz radiation receiver comprises a complementary metal-oxide-semiconductor (CMOS) terahertz receiver.

The terahertz spectroscopy system may further comprise a display coupled to the terahertz radiation receiver for displaying the absorption signal visible to human eyes. For example, the display comprises an integrated circuit for converting the absorption signal to an electrical signal and a screen electrically coupled to the integrated circuit for showing the electrical signal to humans.

The terahertz spectroscopy system may further comprise a control mechanism coupled between the receiver and the display for processing the terahertz beam from the terahertz radiation receiver into the absorption signal. The absorption signal can be shown on the display for humans to see with their eyes.

The terahertz spectroscopy system may further comprise an optical mechanism for guiding the terahertz beam into and out of the measurement unit. In detail, the optical mechanism is coupled on one hand to the waveguide for guiding the terahertz beam into the measurement unit and on the other hand to the terahertz radiation receiver for guiding the terahertz beam from the measurement unit to the terahertz radiation receiver.

The terahertz spectroscopy system may test various samples due to the measurement unit as described in the first aspect. For example, the sample comprises a tablet sample held in the measurement unit. The tablet is prepared by compressing the sample in a compressor under a preset pressure to a predetermined size and a thickness. For another example, the sample comprises the powder sample contained in the plastic package held in the measurement unit according to the description in the first aspect.

The terahertz spectroscopy system can measure the powder sample with quantity of around 5 milligrams (mg). For another example, the sample comprises an aqueous solution sample directly dropped in the measurement unit according to the description in the first aspect. The terahertz spectroscopy system can measure the powder sample with concentration of around 100 part per million (ppm).

In summary, the terahertz spectroscopy system of the subject application is suitable for non-invasive and fast extraction of fingerprints of drugs, medicine and chemicals in small quantity wrapped in commonly used plastic packages or bags, so as to facilitate chemical identification and sorting thereof. The terahertz spectroscopy system thus is significant in many industry application scenarios, e.g. airport fast illicit drug screening, pharmacies at hospital, food safety detection etc.

As a third aspect, the present application discloses a first non-destructive method of detecting a sample using a terahertz spectroscopy system as described in the second aspect. Due to non-destructive or non-invasive nature of the terahertz beam, the sample (such as the powder sample or the aqueous solution sample) would not be discomposed or destroyed in the first non-destructive method and thus may be used for other tests after the terahertz spectroscopy. The first non-destructive method comprises a first step of providing one or more measurement units as described in the first aspect; a second step of measuring a terahertz reference signal from the measurement unit; a third step of preparing a sample into the measurement unit; a fourth step of measuring a terahertz sample signal from the sample held in the measurement unit; and a fifth step of calculating an absorption signal from the terahertz reference signal and the terahertz sample signal.

The first non-destructive method is accurate since the terahertz reference signal as a background of the measurement unit is measured immediately before or after the measurement of the terahertz sample signal of the sample. In other words, environment factors (such as temperature and humidity) are kept the same for the first non-destructive method. In the first non-destructive method, the sample is prepared into the measurement unit before the measurement and cleared from the measurement unit after the measurement.

The preparing step (i.e. the first step as described above) optionally comprises a step of filling a powder sample into a plastic package, and then the plastic package with the power sample is held in the measurement unit. This filling step makes the preparing step much easier when using the terahertz spectroscopy system. In this case, the first second step of measuring a terahertz reference signal includes a step of putting the same plastic package into the measurement unit and thus the terahertz reference signal includes terahertz signal of the plastic package.

The preparing step comprises a step of dropping an aqueous solution sample into the measurement unit; and a next step of a step of drying the aqueous solution. As a result, water content in the aqueous solution would not interfere with the absorption signal of the sample.

The first non-destructive method may further comprise a step of comparing the absorption signal with standard signals stored in a database for identifying the sample. The standard signals are captured to various chemicals and materials beforehand by experts or experienced staff; and then the terahertz spectroscopy system can be conducted by inexperienced staff using the first non-destructive method.

The first non-destructive method may further comprise a step of purging the measurement unit with nitrogen gas for removing water vapor in the measurement unit. As a result, the water vapor in the measurement unit would not interfere with the absorption signal of the sample.

As a fourth aspect, the present application discloses a second non-destructive method of detecting a sample using a terahertz spectroscopy system as described in the second aspect. The second non-destructive method comprises a first step of preparing a sample into the measurement unit as described in the first aspect; a second step of measuring a terahertz sample signal from the sample held in the measurement unit; and a third step of calculating an absorption signal by subtracting a background of the measurement unit from the terahertz sample signal. In contrast to the first non-destructive method, the second non-destructive method does not measure the terahertz reference signal as the background of the measurement unit for each and every sample, but instead the background of the at least one measurement unit is measured before the measuring step for all the samples. As a result, the measurements of the background of the measurement unit and the samples are not conducted under the same environmental factors; and thus the second non-destructive method may not be as accurate as the first non-destructive method, but the second non-destructive method can be conducted much faster than the first non-destructive method. Similar to the first non-destructive method, in the second non-destructive method, the sample is also prepared into the measurement unit before the measurement and cleared from the measurement unit after the measurement.

The second non-destructive method may further comprise a step of pre measuring a terahertz reference signal of the at least one measurement unit; and a next step of storing the terahertz reference signal as the background of the at least one measurement unit. Therefore, only the samples are tested using the terahertz spectroscopy system via the second non-destructive method.

The pre-measuring step is conducted under various environmental factors for obtaining an average of the terahertz reference signal for minimizing influences of the environment factors. In addition, the pre-measuring step is preferably conducted for multiple times in order to exclude errors or any terahertz reference signals conducted under extreme environmental factors (such as high humidity in raining days).

As a fifth aspect, the present application discloses a third non-destructive method of detecting a sample using a terahertz spectroscopy system as described in the second aspect. The third non-destructive method comprises a first step of measuring a terahertz sample signal from a first measurement unit containing a first sample; and a second step of calculating an absorption signal by subtracting a background of the first measurement unit to the terahertz sample signal. Similar to the second non-destructive method, the third non-destructive method also does not measure the terahertz reference signal as the background of the measurement unit for each and every sample, but instead the background of the at least one measurement unit is measured before the measuring step for all the samples. As a result, the third non-destructive method can be conducted much faster than the first non-destructive method. In contrast to the second non-destructive method, in the third non-destructive method, each sample is pre-prepared in its measurement unit before the measurement and then removed from the terahertz spectroscopy system together as a whole after the measurement. Therefore, the third non-destructive method can be conducted even faster than the second non-destructive method since the samples are prepared in their own measurement units respectively before the measurements.

The third non-destructive method may further comprise a step of replacing the first measurement unit with a second measurement unit containing a second sample. Being pre-prepared in the second measurement unit, the second sample can be measured much faster as long as the first sample is removed together with the first measurement from the terahertz spectroscopy system.

As a sixth aspect, the present application discloses a terahertz spectroscopy testing device having the terahertz spectroscopy system as described in the second aspect. In addition to the terahertz spectroscopy system, the terahertz spectroscopy testing device comprises an external case for housing the terahertz spectroscopy system and a touch screen for displaying as well as controlling operation of the terahertz spectroscopy testing device. Furthermore, the terahertz spectroscopy testing device has a power supply for supplying electrical power to the emitter and the receiver. The power supply may have either an alternating current (AC) power plug configured to be electrically connected to an electric grid or rechargeable batteries housed inside the external case.

The accompanying figures (Figs.) illustrate embodiments and serve to explain principles of the disclosed embodiments. It is to be understood, however, that these figures are presented for purposes of illustration only, and not for defining limits of relevant applications.

Figure 1:
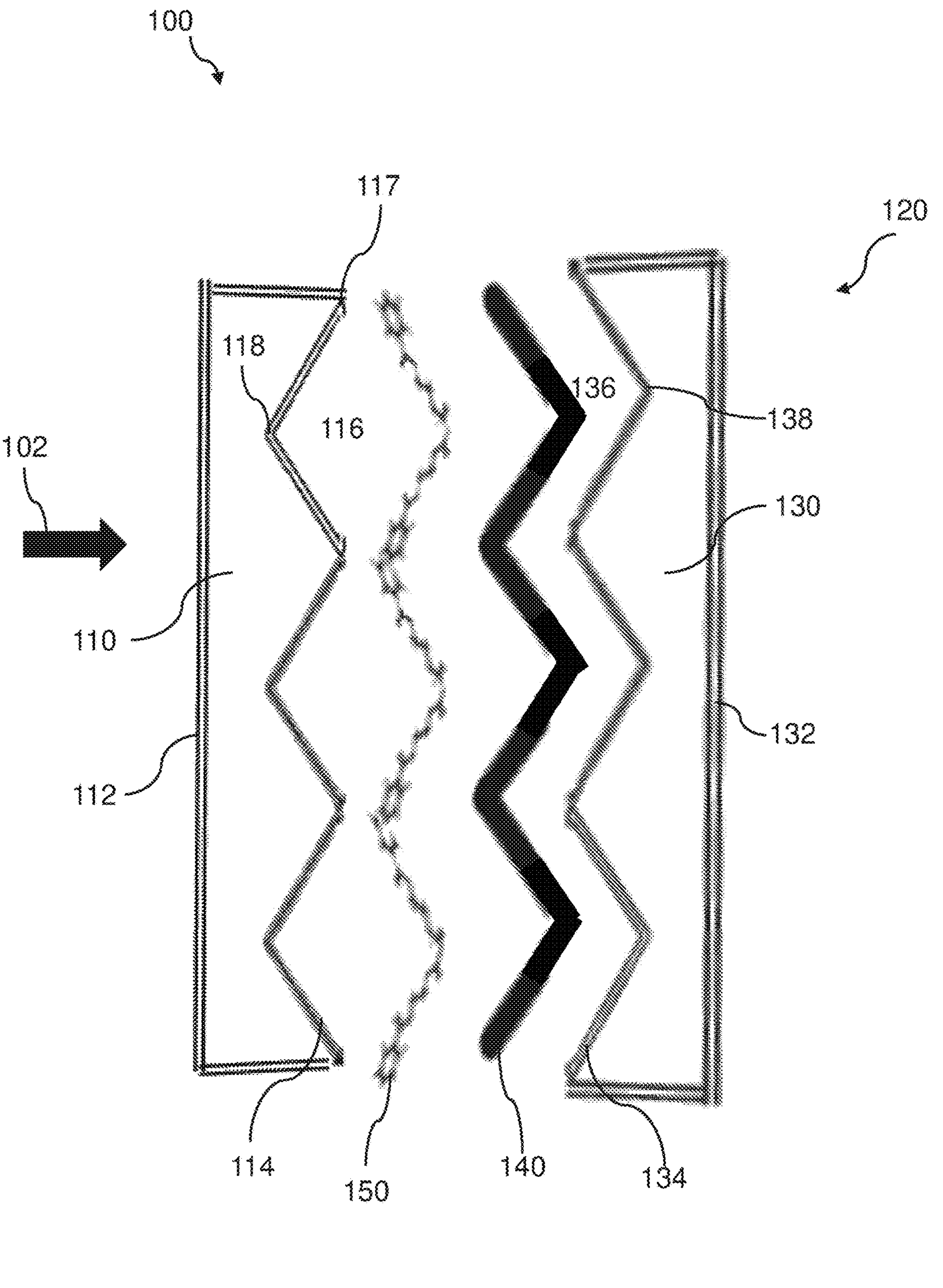
FIG. 1 illustrates a cross-sectional view of a measurement unit according to an embodiment.

FIG. 1 illustrates a cross-sectional view of a measurement unit 100 according to an embodiment. The measurement unit 100 has a cover plate 110 and a bottom plate 120; and a sample (not shown) would be sandwiched between the cover plate 110 and the bottom plate 120 for measuring an absorption signal of the sample to a terahertz beam 102. The cover plate 110 has a first flat surface 112 towards the terahertz beam 102 and a first serrated surface 114 opposed to the first flat surface 112 for enhancing flection of the terahertz beam 102.

The cover plate 110 is made of high-density polyethylene (FIDPE) highly transparent to the terahertz beam 102. The first serrated surface 114 has a plurality of first valleys 116 concave to the first flat surface 112 with first valley tops and first valley bottoms 118 at highest positions and deepest positions, respectively. Thus, the cover plate 110 has a maximum thickness of 1.5 millimeters (mm) measured from the first flat surface 112 to the first valley top 117 and a minimum thickness of 0.5 millimeters (mm) measured from the first flat surface 112 to the first valley bottom 118. In particular, a strong electromagnetic field would be generated around the first valley bottom 118 for reflecting the terahertz beam 102 back to the bottom plate 120.

Figure 2:
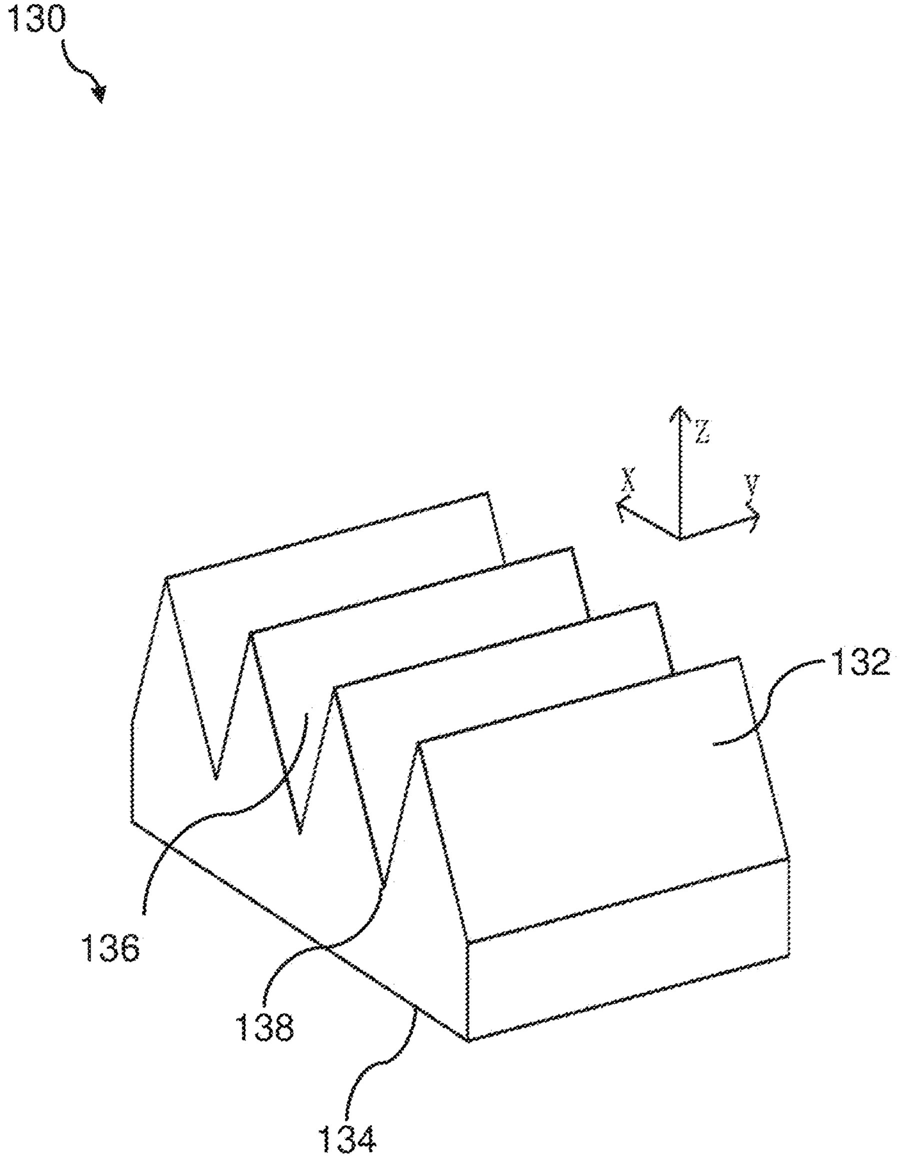
FIG. 2 illustrates a perspective view of a substrate layer of the measurement unit in FIG. 1.

The bottom plate 120 has a multilayer structure, including a substrate layer 130, an intermediate layer 140 and a top layer 150. The substrate layer 130 is made of high-density polyethylene (FIDPE) highly transparent to the terahertz beam 102. Similar to the cover plate 110, the bottom layer 130 has a second serrated surface 134 to the terahertz beam 102 and a second flat surface 132 opposed to second serrated surface 132. The second serrated surface 132 has a plurality of second valleys 136 concave to the second flat surface 132 with second valley tops 137 and second valley bottoms 138 at highest positions and deepest positions, respectively. Thus, the substrate layer 130 has a maximum thickness of 1.5 millimeters (mm) measured from the second flat surface 132 to the second valley top 137 and a minimum thickness of 0.5 millimeters (mm) measured from the second flat surface 132 to the second valley bottom 138. FIG. 2 illustrates perspective view of the substrate layer 130 of the measurement unit in FIG. 1 in a three-dimensional (3D) configuration. The terahertz beam 102 propagates in Z-direction perpendicular to X-direction and Y-direction where the second valleys periodically extend.

The intermediate layer 140 has a continuous metal film (such as gold (Au)) formed on the second serrated surface 134 for reflecting the terahertz beam 102. The continuous metal film has a substantially homogenous thickness of 0.2 millimeters (mm). Thus, the intermediate layer 140 conforms to the contour of the second serrated surface 134. In particular, the intermediate layer 140 partially covers the second serrated surface 134 by exposing certain areas around the second valley bottoms 138 of the second valleys 136.

The top layer 150 has an organic film (such as high density polyethylene (FIDPE)) for further enhancing reflection of the terahertz beam since a strong electromagnetic field would be also generated around the second valley bottom 138 for reflecting the terahertz beam 102 back to the cover plate 110.

Figure 3:
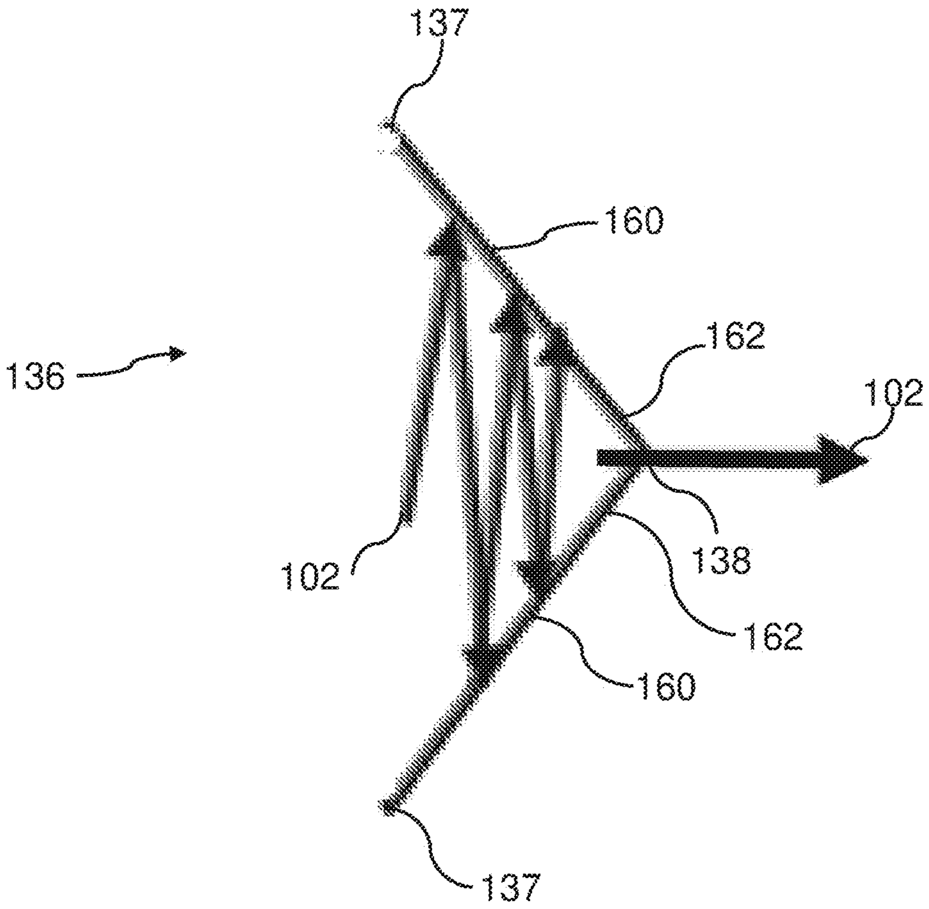
FIG. 3 illustrates a cross-sectional view of a terahertz beam reflected inside a second valley formed by the substrate layer in FIG. 2.

FIG. 3 illustrates a cross-sectional view of the terahertz beam 102 reflected inside the second valley 136 formed by the substrate layer 130 in FIG. 2. Since the second valley 136 is partially covered by the intermediate layer 140 and a top layer 150, the second valley 136 is divided into covered portions 160 around the second valley tops 137 for reflecting the terahertz beam 102 and uncovered portions 162 around the second valley bottoms 138 for the terahertz beam 102 to finally transmit out from the substrate layer 130. As a result, the terahertz beam 102 transmits into the measurement unit 100 from the first flat surface 112, reflects for multiple times between the cover plate 110 and the bottom plate 120 through the sample, and finally transmit out the measurement unit 100 from the second valley bottoms 138.

Figure 4:
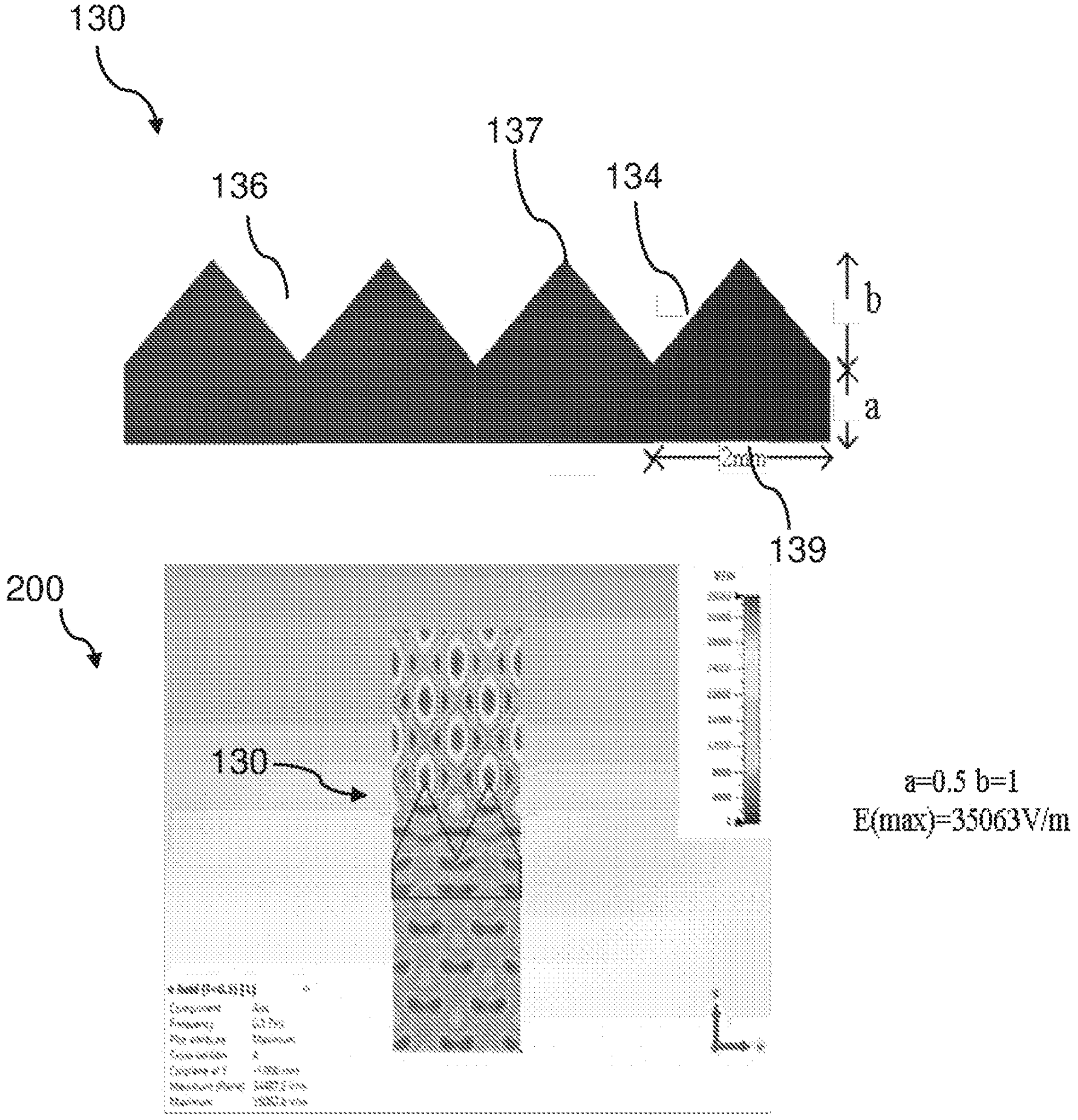
FIG. 4 illustrates a simulation of field enhancement of the second valley in FIG. 3.

FIG. 4 illustrates a simulation 200 of field enhancement of the second valley 136 in FIG. 3. In addition to the maximum thickness of 1.5 millimeters (mm) and the minimum thickness of 0.5 millimeters (mm), the second valley 136 has a width 139 of 2 millimeters (mm) which is comparable to wavelength of the terahertz beam 102 for generating the strong electromagnetic field around the second valley bottoms 138. The simulation 200 is conducted in the following conditions:

1. Software: CST studios suite in a frequency domain at 0.3 terahertz (THz);
2. Parameters:
   component: Abs;
   frequency: 0.3 Terahertz (Thz);
   phase: 0°;
   cross section: A;
   cutplane at Y: −1,000 mm;
   maximum (Plane): 26769.4 V/m; and
   maximum: 28019.5 V/m.
3 Boundary conditions: a periodic boundary condition in X-direction and Y-direction are utilized in the simulation 200, which means the second valleys 136 are periodic in both X-direction and Y-direction to infinite far.
4. Field sources: plane waves are adopted as the excitation sources from top to bottom.
5. Working principles: Resonance phenomenon of the terahertz beam 102 reacting with the substrate layer 130 enhances a field strength at local positions near the second serrated surface 134. As shown in results of the simulation 200, a strongest electromagnetic field is observed near the second valley tops 137. Meanwhile, the strongest electromagnetic filed may appear at the second valley bottoms 138 by fine tuning the dimensions. The strong electromagnetic field would lead to a more sensitive reaction to the sample (particularly powder samples) placed inside the second valley 136; and
6. Simulation Assumptions: a) the material (such as high density polyethylene (FIDPE)) is lossless to the terahertz beam 102, b) the second serrated surface 134 is smooth, and c) the terahertz beam 102 has a plane wave.

Figure 5:
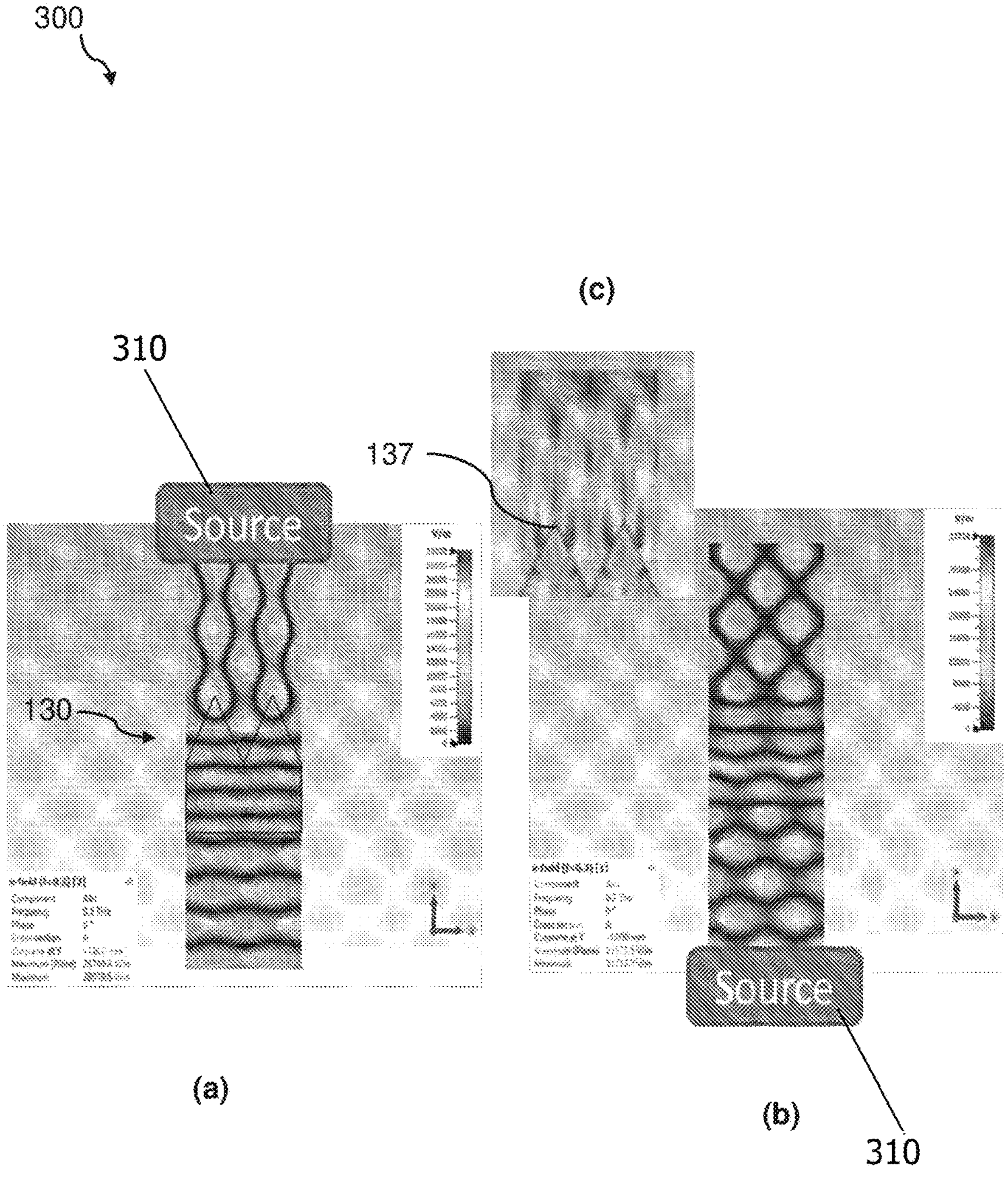
FIG. 5 illustrates a simulation of transmission of the terahertz beam through the second valley in FIG. 3.

FIG. 5 illustrates a simulation of transmission 300 of the terahertz beam 102 through the second valley in FIG. 3. In FIG. 5(*a*), the terahertz irradiation source 310 is located towards the second serrated surface 134; while in FIG. 5(*b*), the terahertz irradiation source 310 is located away from the second serrate surface 134. In both FIG. 5(*a*) and FIG. 5(*b*), with proper design of the second valleys 136 and suitable materials (such as FIDPE, LDPE, TPX), transmission of the terahertz beam 102 without loss can be achieved from a terahertz irradiation source 310. When the terahertz beam 102 incidents into the second valleys 136, the electrical field can be enhanced. The simulation 300 is conducted in the same conditions as described for the simulation 200. FIG. 5(*c*) shows an enlarged view of the electrical field distribution around the second valley top 137.

FIG. 5 illustrates a simulation of transmission 300 of the terahertz beam 102 through the second valley in FIG. 3. In FIG. 5(*a*), the terahertz irradiation source 310 is located towards the second serrated surface 134; while in FIG. 5(*b*), the terahertz irradiation source 310 is located away from the second serrate surface 134. In both FIG. 5(*a*) and FIG. 5(*b*), with proper design of the second valleys 136 and suitable materials (such as FIDPE, LDPE, TPX), transmission of the terahertz beam 102 without loss can be achieved from a terahertz irradiation source 310. When the terahertz beam 102 incidents into the second valleys 136, the electrical field can be enhanced. The simulation 300 is conducted in the same conditions as described for the simulation 200. FIG. 5(*c*) shows an enlarged view of the electrical field distribution around the second valley top 137.

Figure 6:
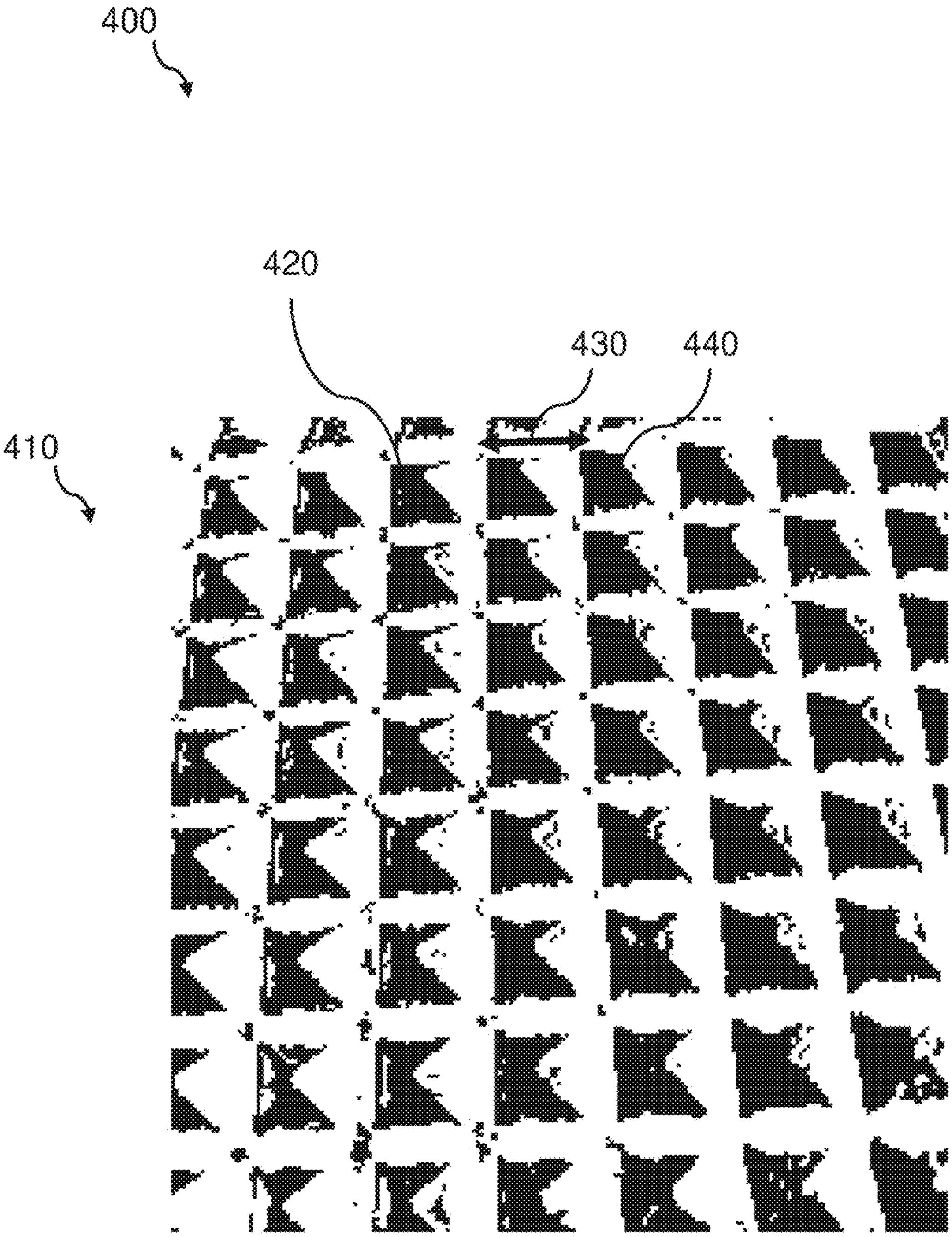
FIG. 6 illustrates a perspective view of an optical microscopy image of an imprinted mould on the serrated surface in FIG. 3.

A legend of FIG. 5(*a*) at bottom left corner indicates that:
e-field (f=0.3) [2]
Component Abs
Frequency 0.3 THz
Phase 0°
Cross Section A Cutplane at Y −1,000 mm
Maximum (Plane) 26769.4V/m
Maximum 28019.5V/m Similarly, a legend of FIG. 5(*b*) at bottom left corner indicates that:

e-field (f=0.3) [1]
Component Abs
Frequency 0.3 THz
Phase 0°
Cross Section A
Cutplane at Y −1,000 mm
Maximum (Plane) 33575.5V/m
Maximum 33713.7V/m FIG. 6 illustrates a perspective view of an optical microscopy image 400 of an imprinted mould 410 to fabricate the serrated surface 134 in FIG. 3. The imprinted mould 410 has a plurality of repetitive features 420. Each of the repetitive features 420 has a square configuration 430 with a side length 430 of 1 millimeter (mm) and a depth 440 of 0.5 millimeter (mm).

Figure 7:
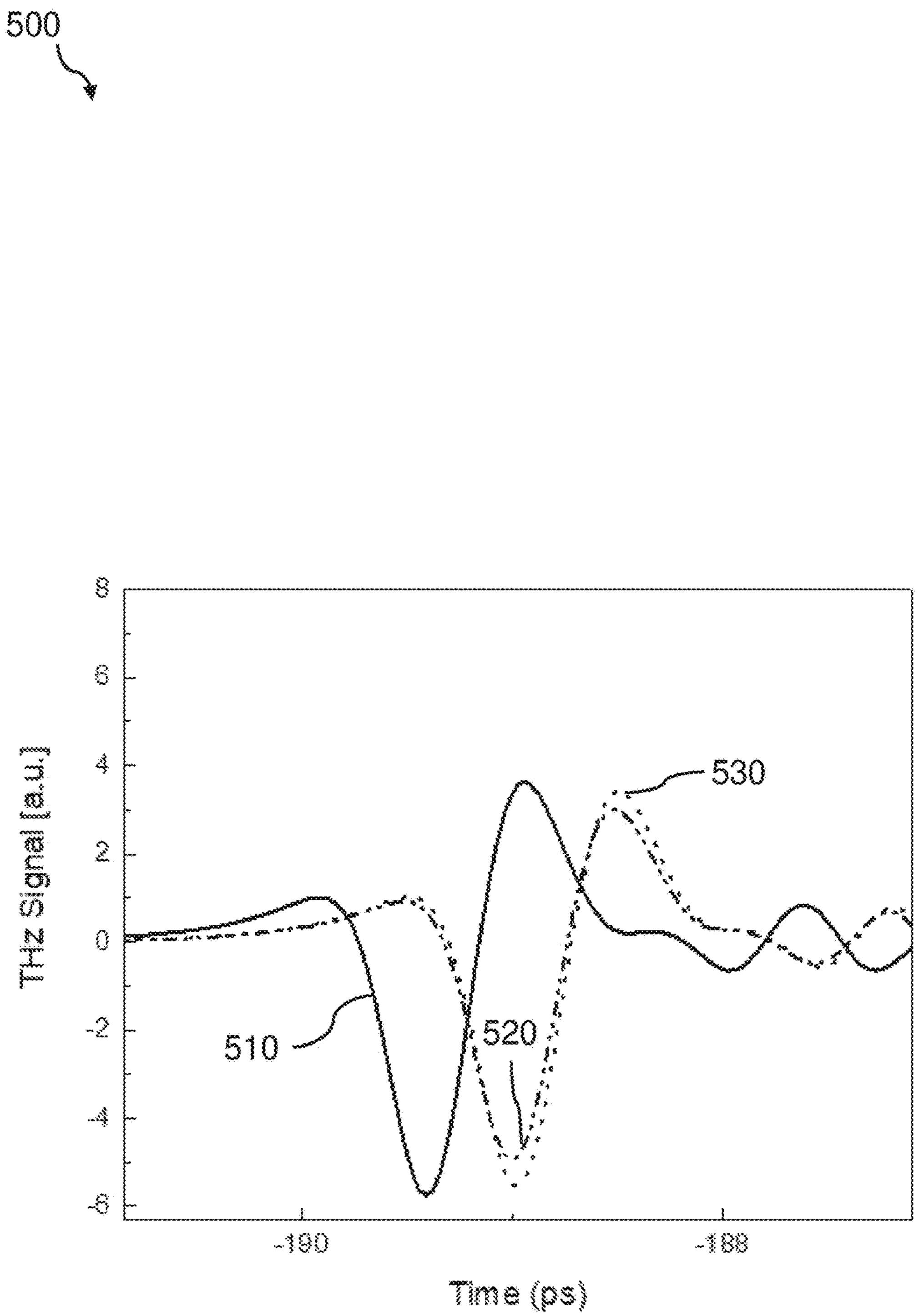
FIG. 7 illustrates a diagram of time-domain spectra of the terahertz beam passing through the second serrated surface with/without a sample.

FIG. 7 illustrates a diagram 500 of time-domain spectra of the terahertz beam 100 passing through the second serrated surface 134 with/without a sample by a terahertz (TFIz) time-domain spectroscopy (TDS). FIG. 7 show a solid line 510 representing a reference signal of the atmospheric air; a dashed line 520 representing a first testing signal of the substrate layer 130 without the sample; and a dotted line 530 representing a second testing signal of the substrate layer 130 with the sample. It is clearly seen that the dotted line 530 is distinct from the dashed line 520, which indicates existence of the sample in the measurement unit 100.

Figure 8:
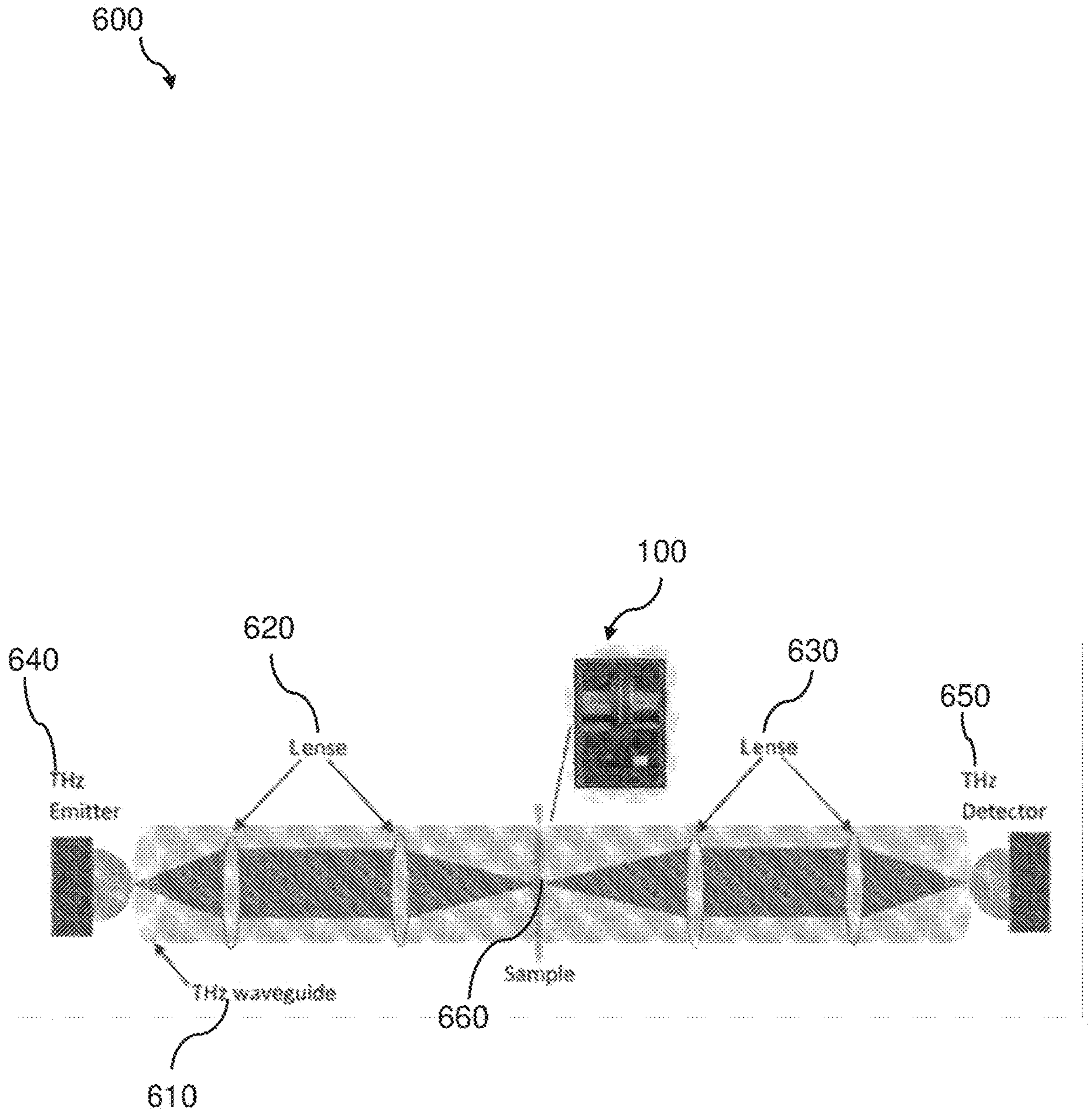
FIG. 8 illustrates a terahertz spectroscopy system according to an embodiment.

FIG. 8 illustrates a terahertz spectroscopy system 600 according to an embodiment. The terahertz spectroscopy system 600 has a terahertz waveguide 610 which further has a first lense (i.e. lens) 620 and a second lense (i.e. lens) 630 aligned in sequence. The measurement unit 100 filled with the sample is placed at a focus point 660 of the terahertz waveguide 610. In addition, the terahertz spectroscopy system 600 has a terahertz radiation source (also known as terahertz emitter) 640 for emitting the terahertz beam 102 and a terahertz radiation receiver (also known as terahertz detector) 650 for detecting the terahertz beam 102 transmitting out from the measurement unit 100.

Figure 9:
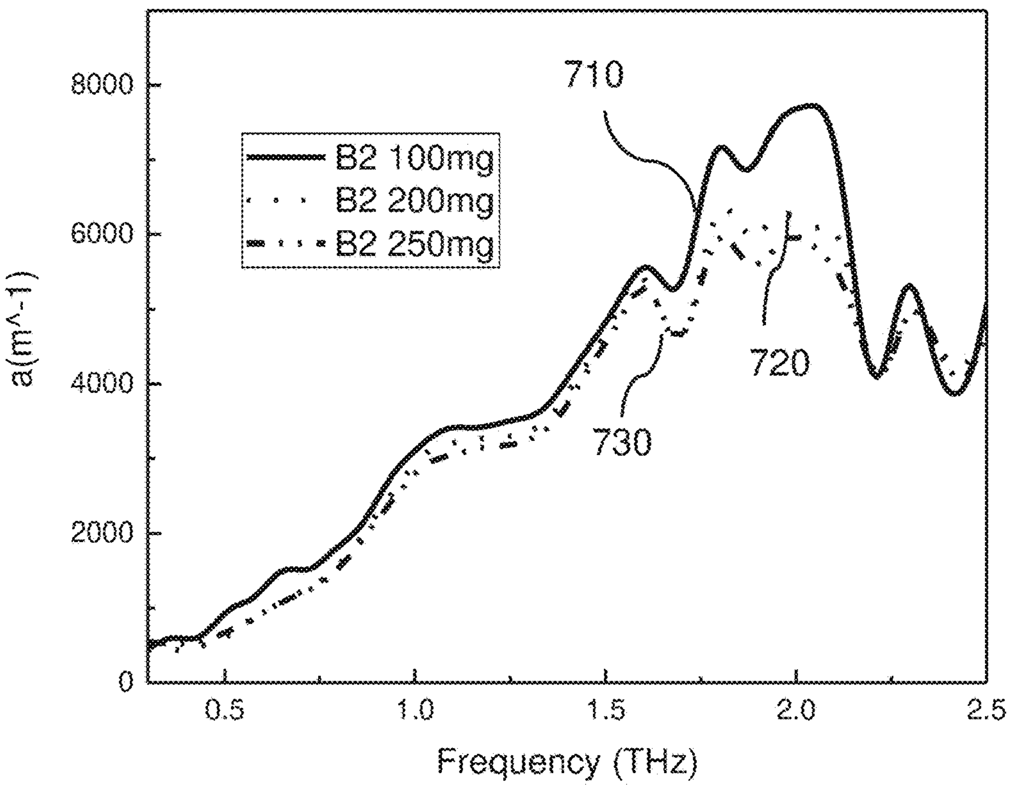
FIG. 9 illustrates a first diagram of absorption coefficient spectra to Vitamin B2 tablet samples using a conventional terahertz spectroscopy system.

FIG. 9 illustrates a first diagram of absorption coefficient spectra 700 to Vitamin B2 tablet samples using a conventional terahertz spectroscopy system in FIG. 8. Three tablet samples are measured with 100 milligram (mg), 200 milligram (mg) and 250 milligram (mg) of Vitamin B2, respectively in detail, FIG. 9 show a solid line 710 representing an absorption coefficient spectrum when the tablet sample contains 100 milligram (mg) of Vitamin B2, a dotted line 720 representing an absorption coefficient spectrum when the tablet sample contains 200 milligram (mg) of Vitamin B2, and a dashed line 730 representing an absorption coefficient spectrum when the tablet sample contains 250 milligram (mg) of Vitamin B2. It is clearly seen that all the three spectra have same characteristics (such as absorption peaks) to the frequency in the rage of terahertz, and only differ in amplitude.

Figure 10:
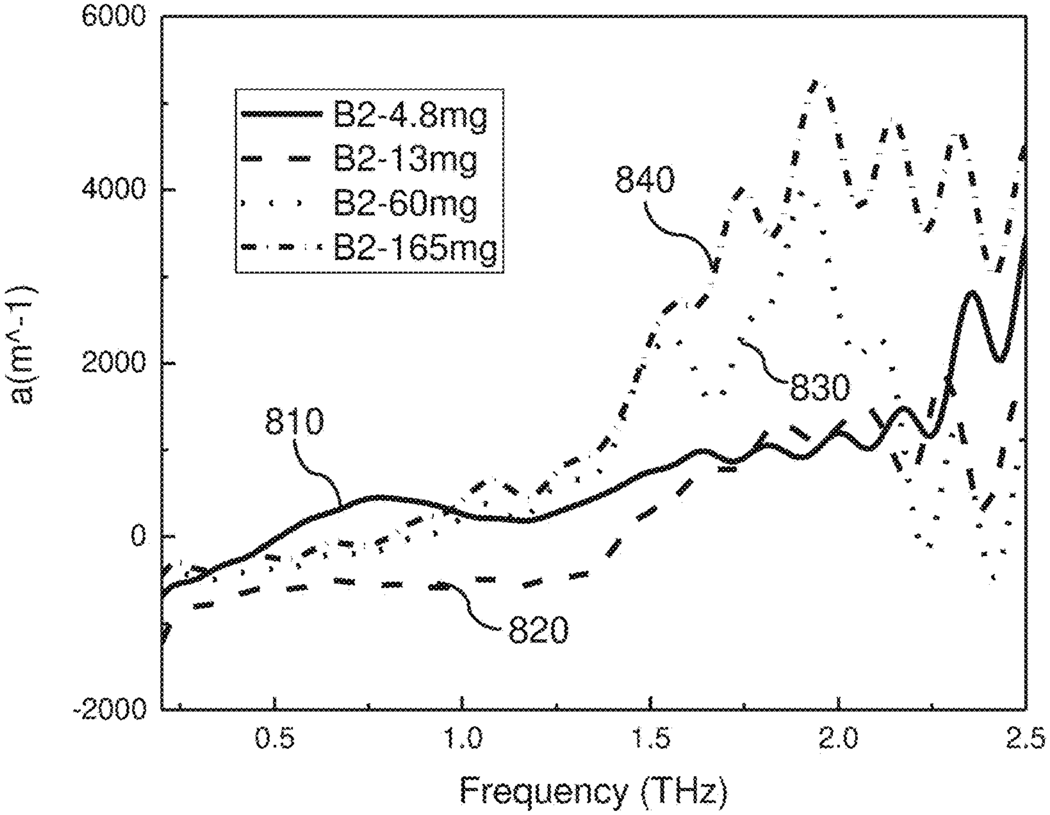
FIG. 10 illustrates a second diagram of absorption coefficient spectra to Vitamin B2 powder samples using the conventional terahertz spectroscopy system in FIG. 9.

FIG. 10 illustrates a second diagram of absorption coefficient spectra 800 to Vitamin B2 powder samples using the conventional terahertz spectroscopy system in FIG. 9. Four powder samples are measured with amounts of 4.8 milligram (mg), 13 milligram (mg), 60 milligram (mg) and 165 milligram (mg). The powder sample is spread on a transparent plastic holder and a transmission spectrum is measured, and an absorption spectrum is calculated accordingly. In detail, FIG. 10 show a solid line 810 representing an absorption coefficient spectrum with 4.8 milligram (mg) of Vitamin B2 powder, a dashed line 820 representing an absorption coefficient spectrum with 13 milligram (mg) of Vitamin B2 powder, a dotted line 830 representing an absorption coefficient spectrum with 60 milligram (mg) of Vitamin B2 powder, and a dash-dotted line 840 representing an absorption coefficient spectrum with 165 milligram (mg) of Vitamin B2 powder. It is clearly seen that the dotted line 830 and the dash-dotted line 840 have similar characteristics as the tablet samples in FIG. 9. In contrast, some absorption peaks become smaller or even disappear in the solid line 810 and the dashed line 820. Therefore, the conventional terahertz spectroscopy system cannot measure powder samples in small quantity effectively.

Figure 11:
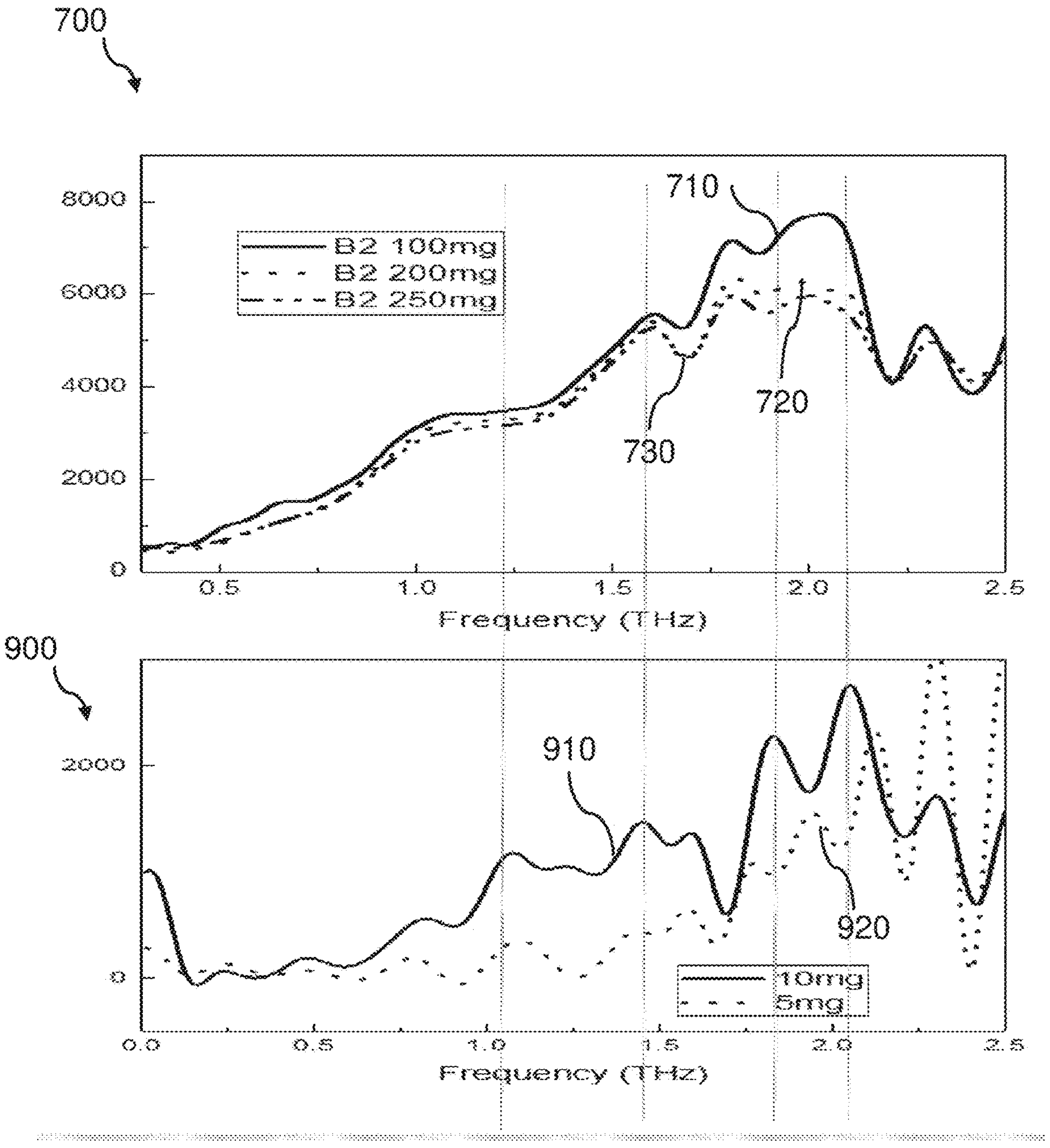
FIG. 11 illustrates a third diagram of absorption coefficient spectra to Vitamin B2 powder samples using the terahertz spectroscopy system in FIG. 8, and comparing with the first diagram of absorption coefficient spectra to the Vitamin B2 tablet samples in FIG. 9.

FIG. 11 illustrates a third diagram of absorption coefficient spectra 900 to Vitamin B2 powder samples using the terahertz spectroscopy system in FIG. 8, and comparing with the first diagram of absorption coefficient spectra 700 to the Vitamin B2 tablet samples in FIG. 9. In detail, FIG. 11 shows a solid line 910 representing an absorption coefficient spectrum with 10 milligram (mg) of Vitamin B2 powder, and a dotted line 920 representing an absorption coefficient spectrum with 5 milligram (mg) of Vitamin B2 powder. The powder samples are firstly spread into the second valleys 136 of the bottom plate 120; and then the cover plate 110 is covered to the bottom plate 120 to close the measurement unit 110 together. The measurement unit 110 is finally inserted into the focus point 660 of the terahertz waveguide 610. The powder samples are repetitively measured for obtaining averages for the third diagram of absorption coefficient spectra 900. It is clear seem from the comparison that the solid line 910 and the dotted line 920 have similar characteristics (such as absorption peaks) to the solid line 710, the dotted line 720 and the dashed line 730 using the conventional terahertz spectroscopy system. Therefore, terahertz spectroscopy system of the subject application can measure powder samples in small quantity.

Figure 12:
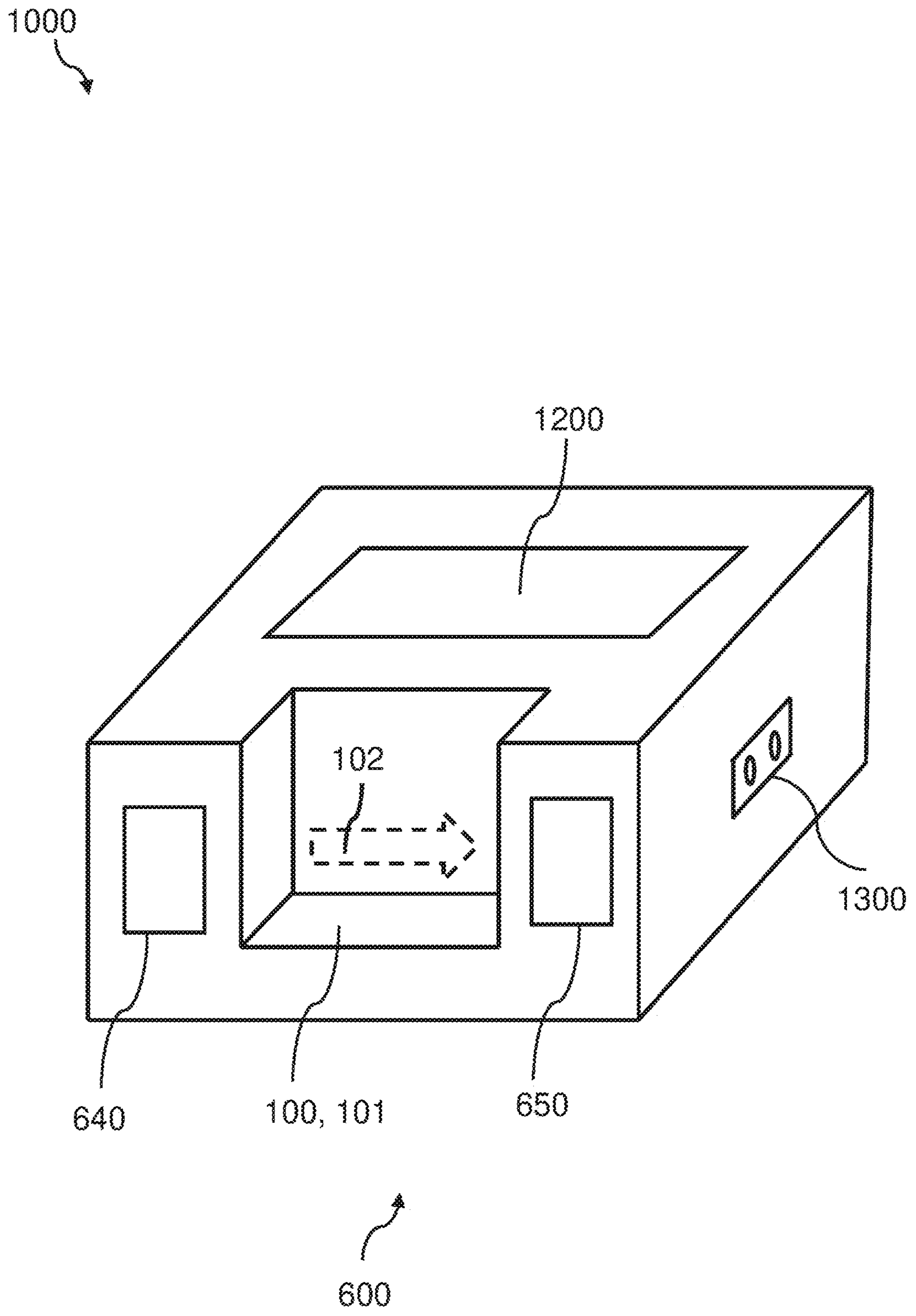
FIG. 12 illustrates a terahertz spectroscopy testing device having the terahertz spectroscopy system shown in FIG. 8.

FIG. 12 illustrates a terahertz spectroscopy testing device 1000 having the terahertz spectroscopy system 600 shown in FIG. 8. The terahertz spectroscopy testing device 1000 has an external case 1100 for housing the terahertz spectroscopy system 600. As shown in FIG. 12, the terahertz beam 102 is emitted from the terahertz radiation source 640, passing through a sample (not shown) on a platform 101 (also known as holder, keeper or receptacle) of the terahertz spectroscopy system 600 or the terahertz spectroscopy testing device 1000, then transmitted through the measurement unit 100 and finally received by the terahertz radiation receiver 650. In addition, the terahertz spectroscopy testing device 1000 has a touch screen 1200 for displaying as well as controlling operations of the terahertz spectroscopy system 600. Furthermore, the terahertz spectroscopy testing device 1000 has a power supply 1300 (e.g. AC-DC converter for converting AC 220V to DC 12V) for supplying electric power to the terahertz spectroscopy testing device 1000.

In the application, unless specified otherwise, the terms "comprising", "comprise", and grammatical variants thereof, intended to represent "open" or "inclusive" language such that they include recited elements but also permit inclusion of additional, non-explicitly recited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

REFERENCE NUMERALS

100 measurement unit;
101 platform, holder, platform or receptacle
102 terahertz beam;
110 cover plate;
112 first flat surface;
114 first serrates surface;
116 first valley;
117 first valley top;
118 first valley bottom;
120 bottom plate;
130 substrate layer;
132 second flat surface;
134 second serrates surface;
136 second valley;
137 second valley top;
138 second valley bottom;
139 second width;
140 intermediate layer;
150 top layer;
160 cover portion;
162 uncover portion;
200 simulation of field enhancement;
300 simulation of transmission;
310 terahertz irradiation source;
400 optical microscopy image;
410 imprinted mould;
420 repetitive feature;
430 side length;
440 depth;
500 diagram of time-domain spectra;
510 solid line;
520 dashed line; 530 dotted line;
600 terahertz spectroscopy system;
610 terahertz waveguide;
620 first lense; 630 second lense;
640 terahertz radiation source;
650 terahertz radiation receiver;
660 focus point;
700 first diagram of absorption coefficient spectra; 710 solid line;
720 dotted line;
730 dashed line;
800 second diagram of absorption coefficient spectra; 810 solid line; 820 dashed line;
830 dotted line;
840 dash-dotted line;
900 diagram of absorption coefficient spectra;
910 solid line; 920 dotted line.

The invention claimed is:

1. A measurement unit for holding a sample in a terahertz spectroscopy system comprising:
a cover plate; and
a bottom plate for enhancing an absorption signal of the sample to the terahertz beam;
wherein the sample is configured to be sandwiched between the cover plate and the bottom plate for absorbing the terahertz beam;
wherein the cover plate has a first flat surface towards the terahertz beam and a first serrated surface opposed to the first flat surface for enhancing reflection of the terahertz beam;
wherein the bottom plate has a multilayer structure for enhancing sensitivity of the absorption signal to the terahertz beam, comprising:
a substrate layer having a second serrated surface to the terahertz beam and a second flat surface opposed to the second serrated surface;
an intermediate layer formed on the second serrated surface of the substrate layer for reflecting the terahertz beam; and
a top layer formed on the intermediate layer for enhancing reflection of the terahertz beam; and,
wherein the cover plate, and the substrate layer and the top layer of the bottom plate comprise high-density polyethylene (HDPE), low-density polyethylene (LDPE), polytetrafluoroethylene, poly-4-methylpentene-1 or polypropylene.

2. The measurement unit of claim 1 further comprising:
a linear waveguide for directing the terahertz beam from an emitter to a near-field of the measurement unit and subsequently directing the terahertz beam from the measurement unit to a detector.

3. A terahertz spectroscopy system for detecting a sample comprising:
a terahertz radiation source for transmitting a terahertz beam;
the at least one measurement unit of claim 1;
a terahertz radiation receiver for receiving the terahertz beam after passing through the at least one measurement unit;
a first plurality of lenses positioned between the terahertz radiation source and the at least one measurement unit;
a second plurality of lenses positioned between the at least one measurement unit and the terahertz radiation receiver;
an external case for housing the terahertz spectroscopy system;
a touch screen coupled to the terahertz spectroscopy system for displaying and controlling operation of the terahertz spectroscopy system; and
a display coupled to the terahertz radiation receiver for displaying the absorption signal;
wherein the at least one measurement unit is positioned at a focus point of the first plurality of lenses;
wherein the terahertz radiation receiver is positioned at a focus point of the second plurality of lenses; and
wherein the terahertz radiation source, the at least one measurement unit, the first plurality of lenses, the second plurality of lenses and the terahertz radiation receiver are arranged along the same axis.

4. The terahertz spectroscopy system of claim 3 further comprising:

a control mechanism coupled between the receiver and the display for processing the terahertz beam from the terahertz radiation receiver into the absorption signal.

5. The terahertz spectroscopy system of claim 3, wherein:

the sample comprises a tablet sample, a powder sample or an aqueous solution sample held in the at least one measurement unit.

6. A non-destructive method of detecting a sample using a terahertz spectroscopy system of claim 3 comprising the steps of:

providing the at least one measurement unit;

measuring a terahertz reference signal from the at least one measurement unit;

preparing a sample into the at least one measurement unit;

measuring a terahertz sample signal from the sample held in the at least one measurement unit; and calculating an absorption signal from the terahertz reference signal and the terahertz sample signal.

7. The non-destructive method of claim 6, wherein the preparing step comprises a step of filling a powder sample into a plastic package.

8. The non-destructive method of claim 6, wherein the preparing step comprises a step of dropping an aqueous solution sample into the at least one measurement unit; and a step of drying the aqueous solution.

9. The non-destructive method of claim 6 further comprising:

comparing the absorption signal with standard signal stored in a database for identifying the sample.

10. The non-destructive method of claim 6 further comprising:

purging the at least one measurement unit for removing water vapor in the at least one measurement unit.

11. A non-destructive method of detecting samples using a terahertz spectroscopy system of claim 3 comprising the steps of:

measuring a terahertz sample signal from a first measurement unit containing a first sample; and calculating an absorption signal by subtracting a background of the first measurement unit to the terahertz sample signal.

12. The non-destructive method of claim 11 further comprising:

replacing the first measurement unit with a second measurement unit containing a second sample.

13. A non-destructive method of detecting a sample using a terahertz spectroscopy system comprising the steps of:

preparing a sample into the at least one measurement unit of claim 1;

measuring a terahertz sample signal from the sample held in the at least one measurement unit; and calculating an absorption signal by subtracting a background of the at least one measurement unit from the terahertz sample signal, wherein the background of the at least one measurement unit is prepared before the measuring step.

14. The non-destructive method of claim 13 further comprising:

pre-measuring a terahertz reference signal of the at least one measurement unit; and storing the terahertz reference signal as the background of the at least one measurement unit.

* * * * *